(12) United States Patent
Simoni (10) Patent No.: US 9,462,918 B2
(45) Date of Patent: Oct. 11, 2016

(54) COMBINATION TOWELS AND MITTS

(71) Applicant: Jacquelyn Rose Simoni, Glen Ellyn, IL (US)

(72) Inventor: Jacquelyn Rose Simoni, Glen Ellyn, IL (US)

(73) Assignee: Jacquelyn Simoni, Birchbrook, CT (US)

( * ) Notice: Subject to any disclaimer, the term of this patent is extended or adjusted under 35 U.S.C. 154(b) by 0 days.

(21) Appl. No.: 14/156,383

(22) Filed: Jan. 15, 2014

(65) Prior Publication Data

US 2016/0198922 A1    Jul. 14, 2016

Related U.S. Application Data

(60) Provisional application No. 61/753,041, filed on Jan. 16, 2013.

(51) Int. Cl.
| | |
|---|---|
| *A01K 13/00* | (2006.01) |
| *A47K 7/02* | (2006.01) |
| *A41D 19/00* | (2006.01) |
| *A47L 13/18* | (2006.01) |

(52) U.S. Cl.
CPC ............ *A47K 7/02* (2013.01); *A01K 13/001* (2013.01); *A41D 19/0024* (2013.01); *A41D 19/0037* (2013.01); *A47K 7/022* (2013.01); *A47L 13/18* (2013.01)

(58) Field of Classification Search
CPC ............ A01K 13/001; A41D 19/00; A41D 19/0024; A41D 19/0034; A41D 19/0037; A41D 19/01; A47K 7/02; A47K 7/022; A47K 7/03; A47L 13/18; A47L 13/19; A61H 11/00; A61H 2011/005

USPC ............ 15/222, 227; 2/16, 20, 21, 158–160, 2/161.6, 161.7, 163; 119/600, 650, 652; 401/6–8; 601/136–138, 143

See application file for complete search history.

(56) References Cited

U.S. PATENT DOCUMENTS

| | | | | |
|---|---|---|---|---|
| 1,533,733 | A * | 4/1925 | Gillum .................... | A47K 7/022 15/222 |
| 4,085,464 | A * | 4/1978 | Simonoff .......... | A41D 19/01529 2/158 |
| 4,779,289 | A * | 10/1988 | Prouty .................... | A41D 19/00 2/159 |
| 5,509,164 | A * | 4/1996 | Weill ..................... | A47K 7/022 15/222 |

FOREIGN PATENT DOCUMENTS

| | | | |
|---|---|---|---|
| JP | 2000-41887 | * | 2/2000 |
| JP | 2000-254033 | * | 9/2000 |
| JP | 2001-299629 | * | 10/2001 |
| JP | 2006-141973 | * | 6/2006 |

* cited by examiner

*Primary Examiner* — Mark Spisich (57) ABSTRACT

The invention is a device to dry/clean an animal, such as a dog, cat or child when they are wet or dirty. It consists of two mitts, each having one flat side, attached to opposite ends of a towel. The device is an improvement over a towel since it can better hold the animal or child during drying. Mitts fit on a person's hand. They offer more control but they lack the surface area to dry an animal completely. Combining a towel and two mitts creates a drying instrument which both controls an animal or child and provides an ample surface to dry/clean them. Making the mitts attachable and detachable adds flexibility to the drying device since you can use only the portion of the drying device you need.

1 Claim, 9 Drawing Sheets

COMBINATION TOWELS AND MITTS

CROSS REFERENCE TO RELATED APPLICATION

This invention claims the priority of U.S. Provisional Patent Application Ser No. 61/753,041, filed Jan. 16, 2013; for "PET DRYING SYSTEM."

FIELD OF THE INVENTION

The present invention relates generally to a highly absorbent drying device for drying/cleaning animals, such as dogs and cats and children. It combines the characteristics of a towel and mitts for better control and better absorption since more of the surface of the device lies flat on the animal or child.

SUMMARY OF THE INVENTION

Towels and mitts haven't been combined in the past. Towels are large and rectangular and mitts are small and rounded in shape so they don't normally fit together: Mitts are shaped like a hand so the top of the mitt fans out. Often mitts are glove like and have slots for appendices. Mitts are often gathered at the wrist so they fit the band better and don't slide off the hand.

The invention consists of two highly absorbent mitts, each having one flat side, attached to opposite ends of an absorbent towel. The mitts each have one flat side so they can be attached to the flat end of a towel and at least one thumb to enhance control of the drying device. The towel and mitts are also approximately the same height. This creates a device that more optimally dry's an animal, such as a dog or child because the mitts hold more of the surface of the towel flat on the surface to be dried. It's also easier to dry an animal such as a dog, cat or child because you can hold the animal, using the mitts, on either end of the towel.

The towel portion of the drying device provides drying capacity. The mitts provide more drying capacity and control. The mitts are better for cleaning/drying legs and paws. The mitts are not gathered on the bottom because the drying device should lie flat to optimize drying capacity. The finger portion of each mitt, extends higher than the rest of the drying device which allows the device to "fit" the hand better and to wrap the device around the bead of an animal and cuddle it. Since mitts are at both ends of the towel, the drying device can be turned to the opposite side by switching hands. This doubles the drying capacity of the device since you can dry/clean with both sides of the device.

Although the mitt can be held in place by the fingers and thumb of the person using the device, optimally a means to hold the mitt on the person's hand should be included. Many ways to solve this problem could be employed, including making the thumb crocked or tighter. The drying device could include a protrusion, near the bottom of the thumb, which forms a ledge that the thumb can hold on to, which will prevent the hand from slipping out of the mitt.

The drying device is further enhanced, by providing a means to attach and detach the mitts from the towel. The towel can be removed since sometimes the animal will not be so wet/dirty that two mitts and a towel are needed. It is less cumbersome to use the mitts alone of only the animal's paws are dirty. Only using the portion of the drying towel that is needed, lengthens the life of the drying device, because eliminates the need wash the whole thing as often.

There are several benefits to the drying device:

1. More control because of mitts. Mitts allow you to hold the animal.
2. Mitts allow you to clean/dry smaller areas like legs and paws.
3. Drying device is two sided. Switching hands turns the device around so you can dry/clean on the second side of the device doubling the devices drying capacity.
4. Towel provides drying capacity.
5. The drying device is the optimal way to dry an animal or child. It provides the benefits of a towel, a mitt and a shimmy.
6. It wraps around and cuddles the animal or child making it feel more secure.
7. The drying device could be used to clean/dry other objects than animals and children.
8. Different materials could be used on different parts of the drying device to better perform different tasks.

BRIEF DESCRIPTION OF THE DRAWINGS

The invention may best be understood by reference to the following description taken in conjunction with the accompanying drawings in which:

FIG. 7 is a perspective view of two mitts attached to each side of a towel. This embodiment includes a means to attach and detach the mitts from the towel. Each mitt has several slots to place fingers in.

FIG. 8 is a perspective view of two mitts attached to each side of a towel. In this embodiment the mitts can't be detached from the towel. Each mitt has several slots to place fingers in.

FIG. 9 is a perspective view of one mitt with a hand in it. There is a protrusion near the bottom of the thumb which forms a ledge which the thumb can hold on to.

DETAILED DESCRIPTION OF THE ILLUSTRATED EMBODIMENTS

Although the invention will be described next in connection with certain preferred embodiments, it will be understood that the invention is not limited to those particular embodiments. On the contrary, the descriptions of the invention is intended to cover all alternatives, modifications and equivalent arrangements as may be included within the spirit and scope of the invention as defined by appended claims.

The invention includes two mitts with a towel between them. The device could be made of microfiber or some other highly absorbent material. It can be used to both dry and clean and animal, like a dog or cat or a child. It could be used to clean/dry inanimate objects. The towel could, for instance, dry the animals back while the mitts dry the other animal's chest, stomach and legs. The device can come apart easily because it is fastened together with snaps, a zipper or some other means to bold the mitts and towel together or the mitts and towel could be sewn together. The fasteners need to be both on each end of the towel and the flat edge of the mitts.

You could even hold a small animal or child in the towel portion while you dry the dog with a mitt. When one side of the drier is wet, you can switch hands and dry with the other side thus doubling the drying capacity. The shape allows more drying surface to touch the animal.

Since the drier comes apart, you may only need the mitt part to dry an animal's back if he comes out of the rain and only his back is wet. You can use the mitts if he comes inside and only his feet are wet'dirty. The mitt could be a single layer of fabric or lined with another absorbent fabric. The towel could be doubled up or in a single layer.

Figure 1:
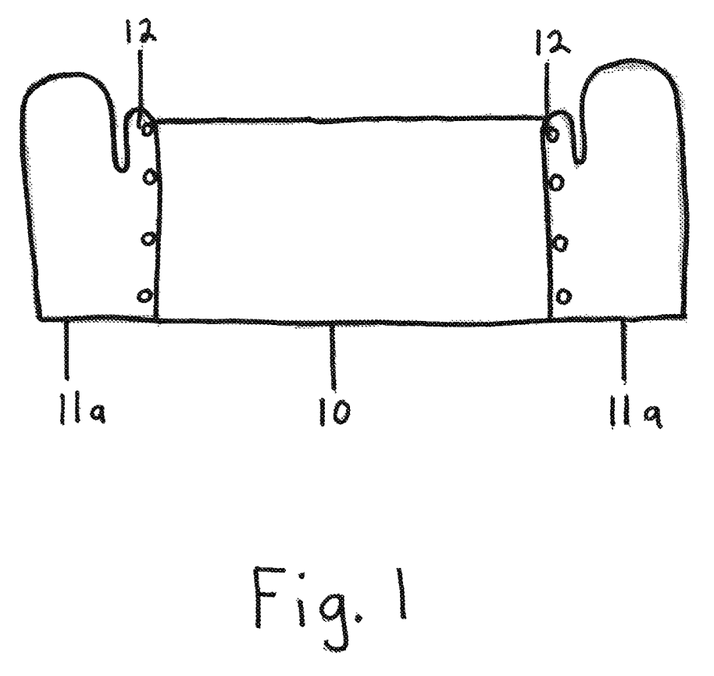
FIG. 1 is a perspective view of two mitts attached to each side of a towel. This embodiment includes a means to attach and detach the mitts from the towel. The thumbs are inwards, towards the towel.

Turning now to the drawings, FIG. 1 shows an absorbent towel 10 with two absorbent mitts 11a each having one thumb facing inward. The flat inward side of the mitt 11a is attached to opposite ends of the towel 10 by some attachment mechanism 12. The attachment mechanism 12 could be snaps, hooks and eyes, Velcro, a zipper or some other means of attaching and detaching two materials.

Figure 2:
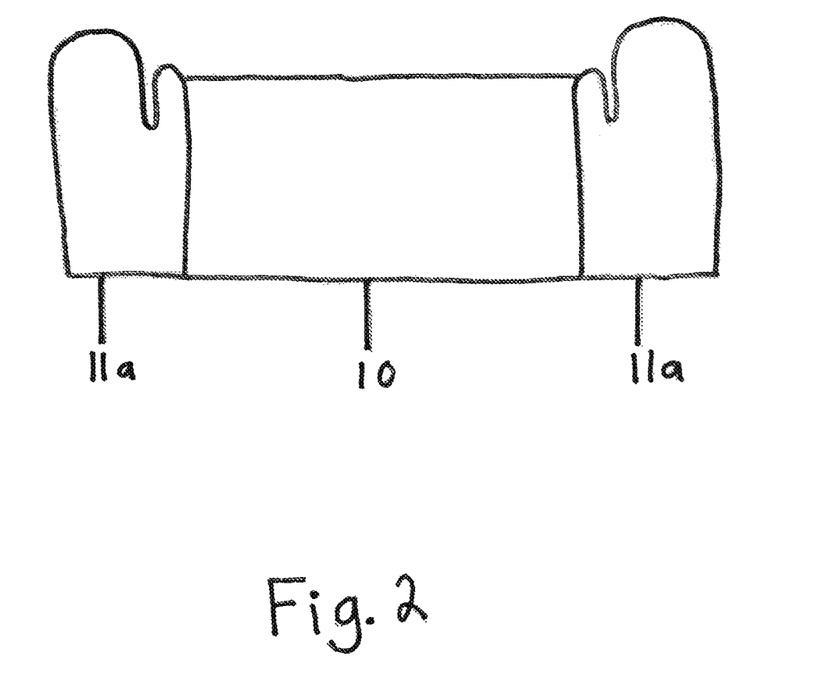
FIG. 2 is a perspective view of two mitts attached to each side of a towel. In this embodiment the mitts can't be detached from the towel. The thumbs are inwards, towards the towel.

FIG. 2 shows an absorbent towel 10 with two absorbent mitts 11a each having one thumb facing inward. The flat inward side of the mitt 11a is attached to opposite ends of the towel 10. In this embodiment the mitts 11 a and the towel 10 are permanently attached.

This embodiment is probably less expense to produce than the embodiment in FIG. 1 but it is less flexible.

Figure 3:
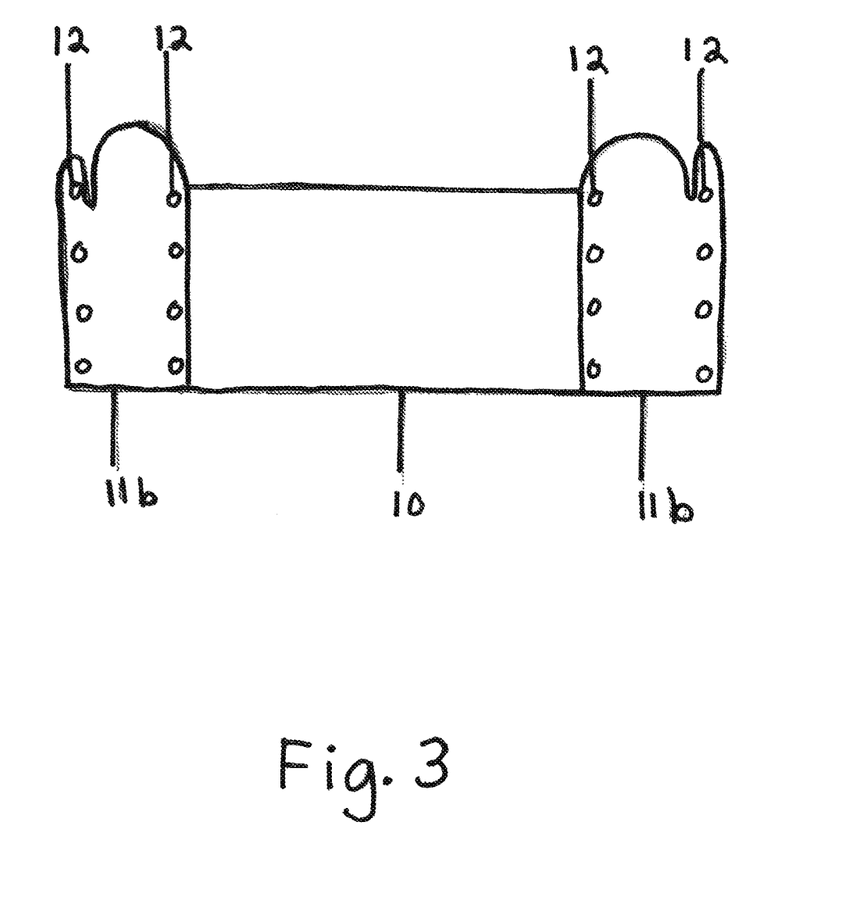
FIG. 3 is a perspective view of two mitts attached to each side of a towel. This embodiment includes a means to attach and detach the mitts from the towel. Either side of each mitt has a means to attach/detach from the towel so the thumbs could be facing out, away from the towel or in, towards the towel.

FIG. 3 shows an absorbent towel 10 with two absorbent mitts 11b each having one thumb which could be facing in either direction. In this embodiment, the attachment mechanism is on both sides of the mitt 11b and both sides of the mitts 11b are flat. The mitt 11b could be attached to the towel 10 with the thumb outward or inward. The attachment mechanism 12 could be snaps, hooks and eyes, Velcro, a zipper or some other means of attaching and detaching two materials. The thumb inward is best for drying an object from above the object. The thumb out is better for drying an object from below the object.

Figure 4:
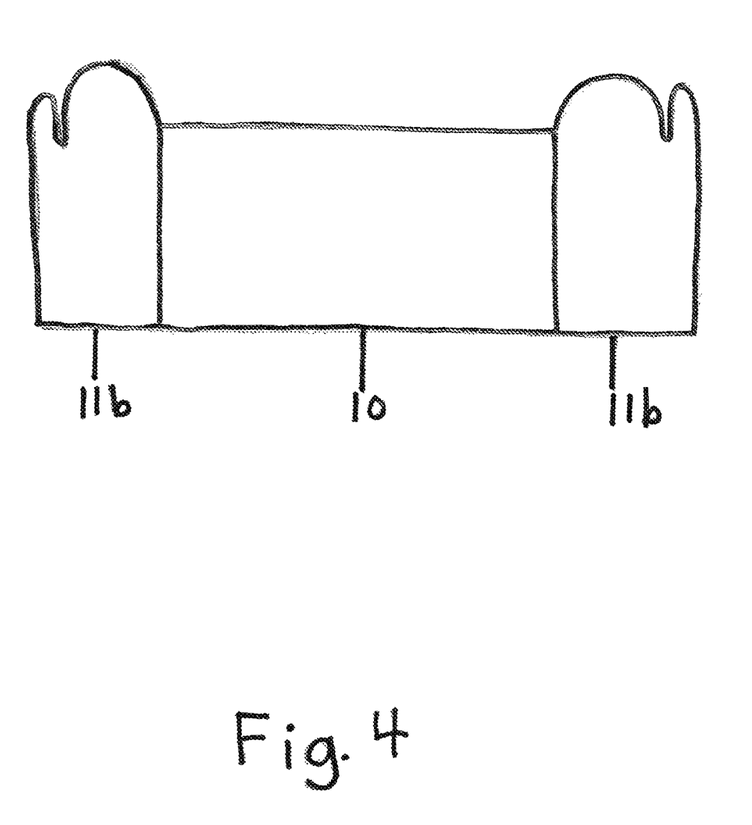
FIG. 4 is a perspective view of two mitts attached to each side of a towel. In this embodiment the mitts can't be detached from the towel. The thumbs are outwards, away from the towel.

FIG. 4 shows an absorbent towel 10 with two absorbent mitts 11b each having one thumb facing outward. The flat inward side of the mitt 11b is attached to opposite ends of the towel 10. In this embodiment the mitts 11b and the towel 10 are permanently attached. This embodiment would be best to dry a child because you can hold the child from the bottom with the towel 10 and dry the child with the mitts 11b.

Figure 5:
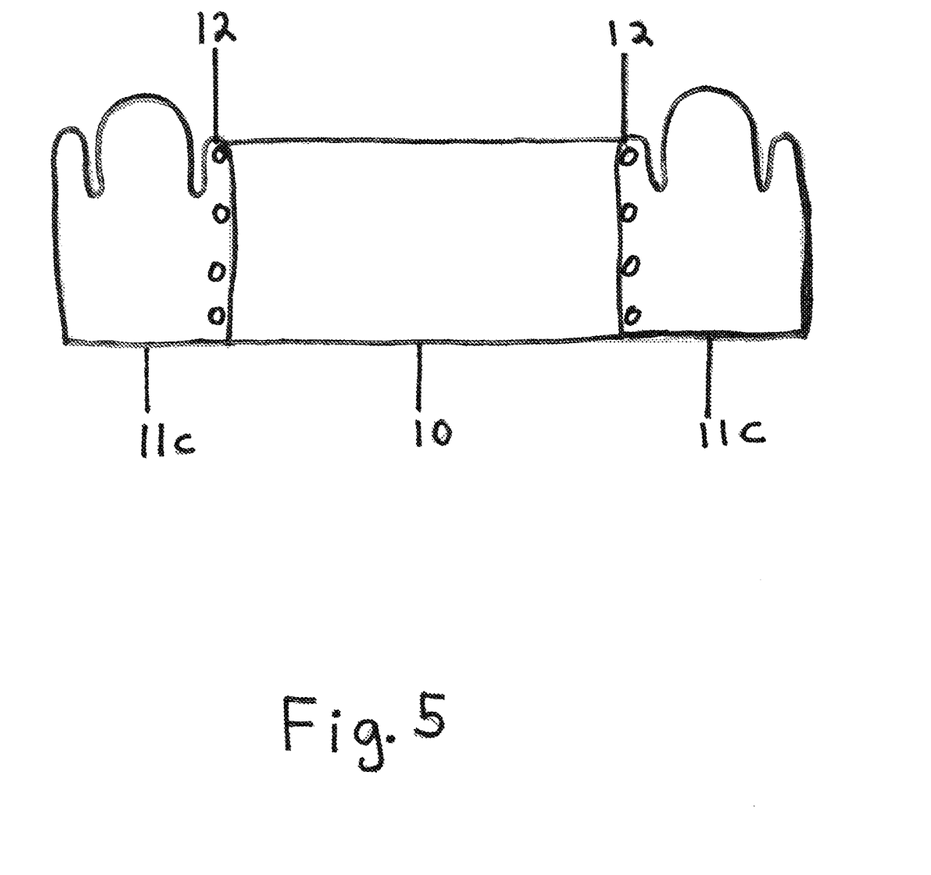
FIG. 5 is a perspective view of two mitts attached to each side of a towel. This embodiment includes a means to attach and detach the mitts from the towel. Each mitt has two thumbs on either side so one thumb is facing in and the other thumb is facing out.

FIG. 5 shows an absorbent towel 10 with two absorbent mitts 11c each having one thumb facing inward and one thumb facing outward. The flat inward side of the mitt 11c is attached to opposite ends of the towel 10 by some attachment mechanism 12. The attachment mechanism 12 could be snaps, hooks and eyes, Velcro, a zipper or some other means of attaching and detaching two materials. This embodiment lets you use the device to dry the object from the top or bottom. Unlike FIG. 3, you don't have to detach and reattach both mitts 11c.

Figure 6:
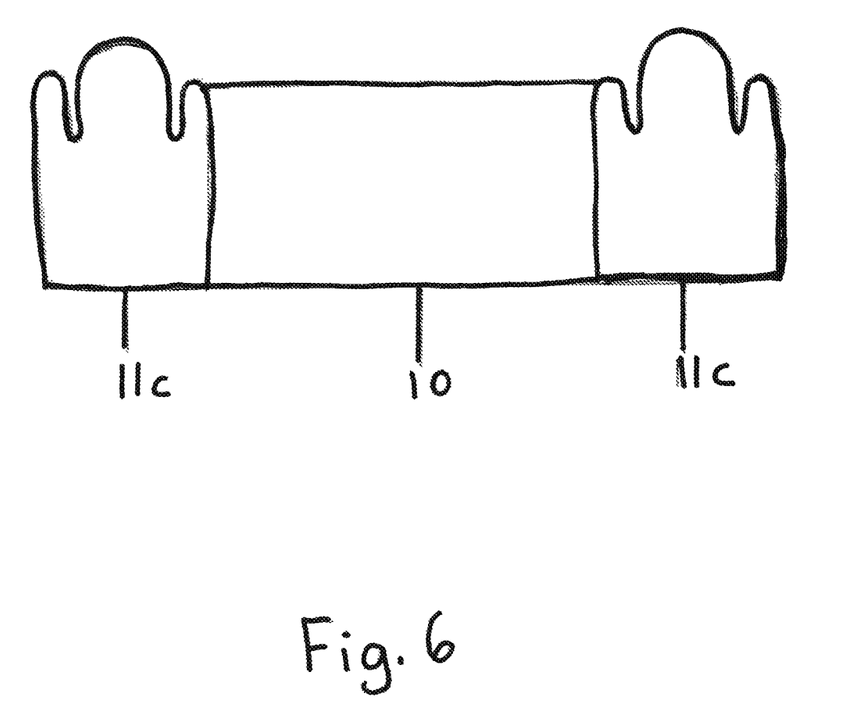
FIG. 6 is a perspective view of two mitts attached to each side of a towel. In this embodiment the mitts can't be detached from the towel. Each mitt has two thumbs on either side so one thumb is facing in and the other thumb is facing out.

FIG. 6 shows an absorbent towel 10 with two absorbent mitts 11c each having one thumb facing inward and one thumb facing outward. The flat inward side of the mitt 11c is sewn to opposite ends of the towel 10. The mitts 11c and towel 10 do not come apart.

Figure 7:
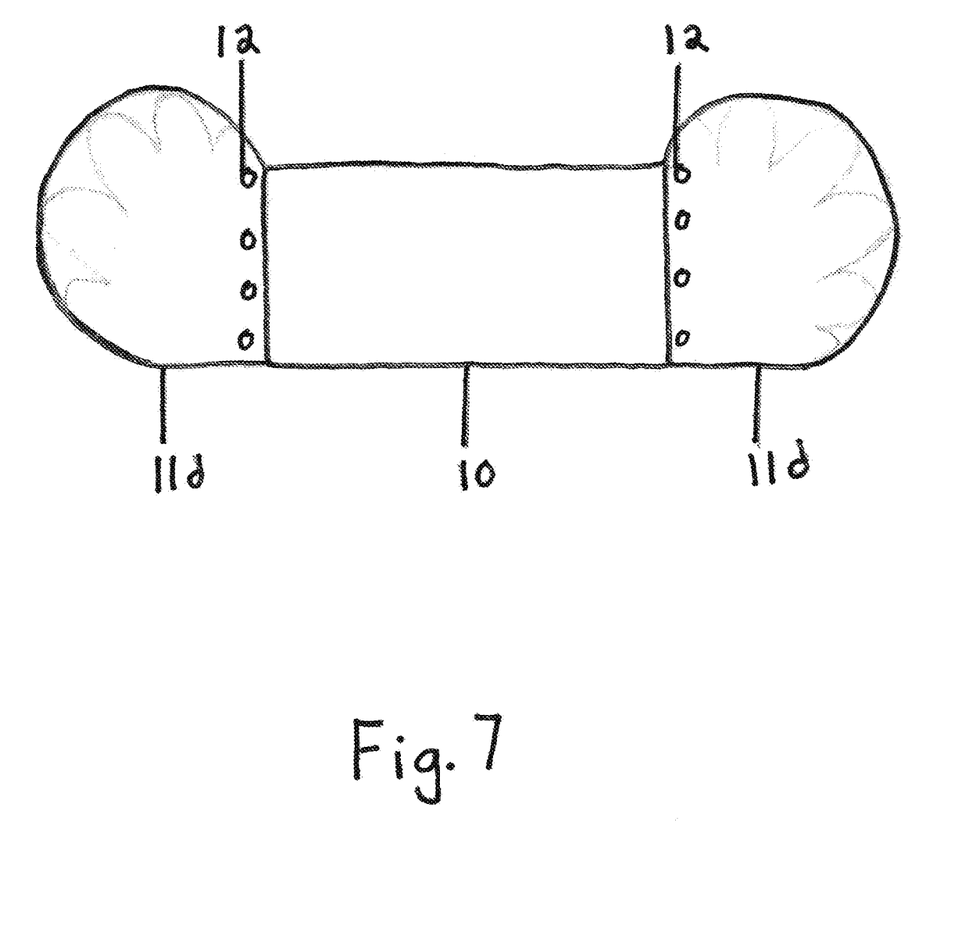

FIG. 7 shows an absorbent towel 10 with two absorbent mitts 11d each having several slots for appendages. The flat inward side of the mitt 11d is attached to opposite ends of the towel 10 by some attachment mechanism 12. The attachment mechanism 12 could be snaps, hooks and eyes, Velcro, a zipper or some other means of attaching and detaching two materials. This embodiment lets you move your hand 14 back and forth.

Figure 8:
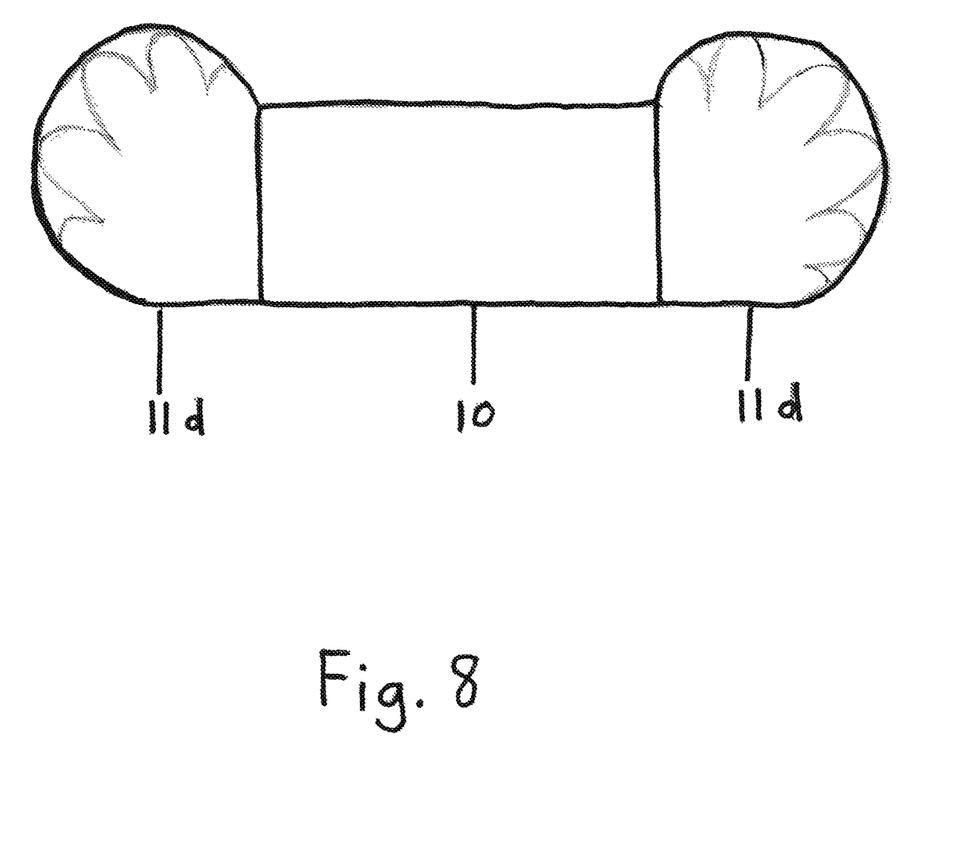

FIG. 8 shows an absorbent towel 10 with two absorbent mitts 11d each having several slots for appendages. The flat inward side of the mitt 11d is attached to opposite ends of the towel 10. The mitts 11d can't be detached. This embodiment lets you move your hand 14 back and forth.

Figure 9:
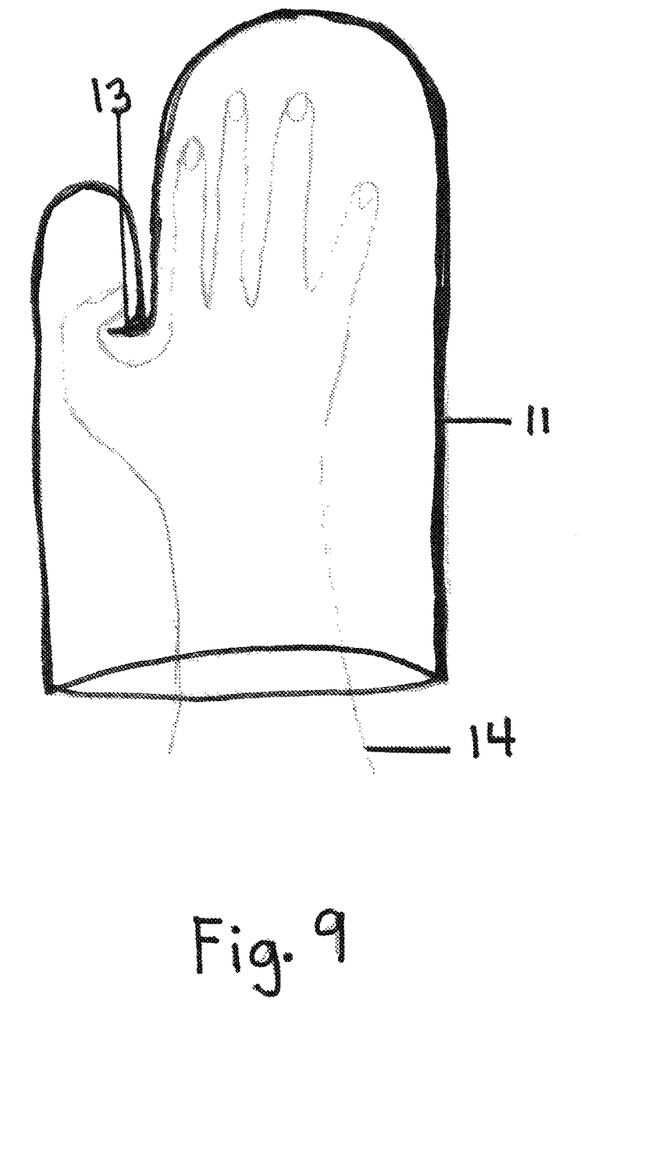

FIG. 9 shows a mitt 11 with a hand in it. There is a protrusion 13 near the bottom of the thumb which forms a ledge which the thumb can hold on to. Although the mitt 11 can be held on the hand by holding the thumb and index finger tightly together, this method makes it easier to hold the hand 14 inside the mitt 11. The mitt 11 could be made with a thumb with a bend at the bottom which would also stop the hand 14 from slipping out. Material could be placed across the finger area that the fingers could hold on to so the hand 14 wouldn't slip out.

What is claimed is:

1. A drying device comprising:
an elongate towel having opposed ends;
first and second mitts, each mitt having a straight side edge portion;
means for releasably attaching each of the mitts to a respective one of the ends of the towel, the mitts being attached to the ends in the region of the straight side edge portions;
the towel and each mitt being formed of an absorbent material; and
wherein the device may be used in a first mode with the towel and mitts attached to each other and in a second mode whereby they are each detached and usable separately.

* * * * *